United States Patent [19]

Pasternack et al.

[11] Patent Number: 4,585,534

[45] Date of Patent: Apr. 29, 1986

[54] OPTICAL GLASS FIBER COATED WITH CATIONICALLY CURABLE POLYEPOXIDE MIXTURES

[75] Inventors: George Pasternack; Timothy E. Bishop, both of Lincolnshire; Orvid R. Cutler, Jr., Rolling Meadows, all of Ill.

[73] Assignee: DeSoto, Inc., Des Plaines, Ill.

[21] Appl. No.: 489,783

[22] Filed: Apr. 29, 1983

[51] Int. Cl.[4] .................... C08F 8/00; C08L 63/00
[52] U.S. Cl. ..................... 522/31; 525/476; 427/54.1; 522/100; 522/111
[58] Field of Search ................ 204/159.13; 525/476

[56] References Cited

U.S. PATENT DOCUMENTS

| | | | |
|---|---|---|---|
| 3,577,263 | 4/1971 | Nordstrom | 525/476 |
| 3,632,440 | 1/1972 | Proston | 525/476 |
| 4,208,471 | 6/1980 | Bresak | 204/159.13 |
| 4,276,135 | 6/1981 | Sato | 204/159.13 |
| 4,385,158 | 5/1983 | Mikami et al. | 525/476 |

OTHER PUBLICATIONS

Photopolymerization of Surface Coatings pp. 75-79; Roffey.
Handbook of Epoxy Resins pp. 5-4 to 513; Lee and Neville.

Primary Examiner—John C. Bleutge
Assistant Examiner—A. L. Carrillo
Attorney, Agent, or Firm—Dressler, Goldsmith Shore, Sutker & Milnamow, Ltd.

[57] ABSTRACT

Freshly drawn optical glass fiber is protected by coating it with an ultraviolet-initiated, cationically curable liquid coating composition comprising a cationically curable polyepoxide, a polysiloxane carrying a plurality of hydroxyalkyl groups, and a photoinitiator and/or photosensitizer for an ultraviolet-activated cationic cure. The coatings are of low modulus and retain a low modulus at temperatures as low as −60° C.

8 Claims, No Drawings

OPTICAL GLASS FIBER COATED WITH CATIONICALLY CURABLE POLYEPOXIDE MIXTURES

DESCRIPTION

1. Field of Invention

This invention relates to the coating of optical glass fibers with coating compositions which cure rapidly by ultraviolet exposure to form low modulus protective coatings which retain the desired low modulus at low temperature (−60° C.) so as to avoid microbending difficulties, and includes the coating compositions which are employed.

2. Background Art

Optical glass fibers must be coated as they are formed in order to protect the sensitive glass surface from abrasion. Ordinary coating compositions cure too slowly, so it has been desired to replace the conventional thermally curable coatings with ultraviolet-curable coatings that cure more rapidly.

Ultraviolet-cured coatings tend to possess an excessively high modulus. Even those ultraviolet-cured coatings which possess a relatively low modulus at room temperature are found to have a much higher modulus at the very low temperatures which optical fibers must be expected to encounter.

The problem is that glass and coatings have different coefficients of thermal expansion. When the coatings have too high a modulus, strains are encountered at low temperature, and these strains induce microbending. The microbends which form interfere with the capacity of the optical fibers to transport a beam of light.

The ultraviolet-curable coatings which have previously been used for application to optical glass fibers have been polyethylenically unsaturated oligomers, normally polyacrylate oligomers in admixture with liquid monomers or low molecular weight polyacrylates. It is desired, in this invention, to employ a different type of ultraviolet-curing composition in order to obtain improved low temperature modulus, and especially a reduced ratio between the modulus at −60° C. to the modulus at 25° C.

DISCLOSURE OF INVENTION

In accordance with this invention, optical glass fiber is coated with an ultraviolet-initiated cationically curable liquid coating composition comprising a cationically curable polyepoxide, a polysiloxane carrying a plurality of hydroxyalkyl groups, and a photoinitiator and/or photosensitizer for an ultraviolet-activated cationic cure. The wet coated glass fiber is then cured by exposure to ultraviolet light. The glass fiber is normally coated as freshly drawn.

The polyepoxides which are cationically curable and used in this invention constitute a known class of materials. Those based on hydrogenated bisphenol, such as Eponex DRH 1511 and DRH 1510, are useful herein, but cycloaliphatic liquid epoxy resins, such as Bakelite ERL 4221 and ERL 4299, are preferred. Hydantoin-based polyepoxides are also useful and available from Ciba-Geigy. These may be used alone, or in combination with glycidyl ethers of a bisphenol, such as the Shell products Epon 828 and Epon 1001, or the Ciba-Geigy product Araldite 6010. These commercial products are all of known composition. Polyepoxides based on phenolic novalac resins and epoxidized polybutadienes, are also useful, especially in admixture with the hydrogenated bisphenol-based polyepoxides or the cycloaliphatic polyepoxides. For monoepoxides may be present, such as Cardura E from Shell Chemical Company which is a glycidyl ester of neodecanoic acid.

Any polysiloxane carrying a plurality of hydroxyalkyl groups can be used. Those having a molecular weight of from 300 to 30,000 are useful, preferably from 1000 to 5000, and these may carry up to about 10 hydroxyalkyl groups per molecule, 2-6 hydroxyalkyl groups being preferred. The alkyl group may contain 2-10, preferably 2-4, carbon atoms, especially ethyl and propyl groups. The hydroxyalkyl group may be positioned at the end of a polyether, polyester or polyamide chain, so long as the molecular weight of the chain does not exceed about 400, or the hydroxyalkyl group may be carried directly on the silicon atoms of the polysiloxane. Primary hydroxy groups are preferred, and the molecular weights are by calculation.

In addition to the hydroxy alkyl groups, the remaining valences of the silicon atoms are substituted with hydrocarbon groups, preferably $C_1$-$C_8$ alkyl, especially methyl, and aryl groups, such as phenyl and $C_1$-$C_{10}$ alkyl-substituted phenyl, like toluyl.

The equivalent ratio of epoxy groups in the polyepoxide to hydroxy groups is also significant. This may broadly range from 1:2 to 40:1, but it is preferably in the range of from 1.5:1 to 6:1.

Photoinitiators useful for the ultraviolet-initiated cationic cure of appropriate polyepoxides in admixture with polyhydric alcohols are known. Diaryliodonium salts, such as the 3M product FC 509, are particularly contemplated, and these are normally used in combination with a ketonic photosensitizer, such as benzophenone. Other photosensitizers are illustrated by chlorothioxanthone, isopropylthioxanthone, thioxanthone, xanthone, and the like. Benzophenone is preferred because of its greater solubility and lower cost.

Since iodonium salts normally require ketonic photosensitizers, it is preferred to employ triaryl sulfonium salts, such as the 3M product FC 508 and UVE-1014 from General Electric Co. These sulfonium salts do not require ketonic photosensitizer.

Small amounts of polyhydric alcohol may be used in addition to the polysiloxane derivatives just described, but these are usually omitted. This optional component is subject to wide variation so long as basic substituents and contaminants are absent. Polyhydric alcohols which are polyethers, such as $C_2$-$C_4$ alkylene oxide adducts of polyhydric alcohols, such as ethylene glycol, butylene glycol, glycerin, trimethylol propane and the like are all useful. Pluracol TP 440 and P 1010 of Wyandotte, polypropylene glycol 425, and Dow products 565 and 8025, all of which are known compositions, can be used herein to supplement the hydroxyalkyl groups in the polysiloxane, and also to provide desired fluidity in the coating composition.

Throughout this application, and in the examples and claims which follow, all parts and proportions are by weight, unless otherwise stated.

EXAMPLE 1

26.9 parts of bis(3,4-epoxycyclohexyl) adipate (Union Carbide ERL-4299 may be used) are mixed with 68.1 parts of a polysiloxane polycarbinol having an average molecular weight of 3000 and carrying an average of three primary hydroxy groups per molecule (Dow product Q2-5103 may be used) and 5 parts of triphenyl sulfonium hexafluoro phosphate catalyst (3M product FC-508 may be used) [a known catalyst for the cationic ultraviolet polymerization of epoxy resin-polyhydric alcohol mixtures]. This mixture is warmed and stirred to form a clear solution. On cooling to 25° C., the solution has a viscosity of 450 centipoises.

The epoxy/hydroxy equivalent ratio in this mixture is 2:1.

Using two 10 inch mercury ultraviolet lamps in tandem, each lamp emitting 300 watts per inch, and moving freshly drawn and coated (with this solution) optical fiber across the width of the two lamps, a cure is obtained at speeds of 20 feet per minute.

EXAMPLE 2

Example 1 is repeated using 29.8 parts of 3,4-epoxycyclohexylmethyl-3,4-epoxycyclohexane carboxylate (the Union Carbide product ERL 4221 may be used), 65.2 parts of an ABA-type polysiloxane polycarbinol having a molecular weight of 2400 carrying two primary hydroxy groups per molecule (the Dow product Q4-3667 may be used), and 5 parts of the same catalyst.

The epoxy/hydroxy equivalent ratio in this mixture is 4:1 and the viscosity at 25° C. is 470 centipoises. The cure speed using the same equipment as in Example 1 is the same as in Example 1.

A comparison of the properties obtained using the above examples of this invention with the properties for two commercially used urethane-acrylate optical fiber coatings which are also exposed to ultraviolet for a rapid cure is presented below.

| Coating | Urethane #1 | Urethane #2 | Ex. 1 | Ex. 2 |
|---|---|---|---|---|
| 25° C. | | | | |
| Tensile - psi | 100 | 104 | 22 | 51 |
| Elongation % | 69 | 57 | 36 | 21 |
| Modulus - psi | 216 | 160 | 80 | 315 |
| −60° C. | | | | |
| Tensile - psi | 5100 | 8040 | 491 | 601 |
| Elongation % | 4 | 25 | 23 | 22 |
| Modulus - psi | 179,800 | 218,700 | 13,582 | 13,750 |
| Modulus ratio (−60° C./25° C.) | 832 | 1367 | 170 | 44 |

As can be seen, the modulus in this invention is much lower, especially at −60° C., and the modulus ratio is much lower indicating that the increase in modulus in going from room to very low temperature is much smaller than one would expect.

What is claimed is:

1. An ultraviolet-initiated, cationically curable liquid coating composition comprising a cationically curable polyepoxide, a polysiloxane carrying a plurality of hydroxyalkyl groups, and a photoinitiator and/or photosensitizer for an ultraviolet-activated cationic cure said polysiloxane having a molecular weight of from 300 to 30,000 and containing from 2-6 hydroxyalkyl groups per molecule, said alkyl groups containing from 2-10 carbon atoms, and primary hydroxy groups.

2. A coating composition as recited in claim 1 in which said polyepoxide is a cycloaliphatic liquid epoxy resin.

3. A coating composition as recited in claim 1 in which said photoinitiator is a triaryl sulfonium salt.

4. A coating composition as recited in claim 2 in which said polysiloxane has a molecular weight of from 1000 to 5000 and contains from 2-4 hydroxyalkyl groups per molecule, said alkyl groups containing from 2-4 carbon atoms, the remaining valence bonds on the silicon atoms in said polysiloxane carrying alkyl or aryl groups.

5. A coating composition as recited in claim 4 in which said valence bonds carry methyl groups.

6. A coating composition as recited in claim 1 in which the equivalent ratio of epoxy groups to hydroxy groups is from 1:2 to 40:1.

7. A coating composition as recited in claim 4 in which the equivalent ratio of epoxy groups to hydroxy groups is from 1.5:1 to 6:1.

8. A method of coating an optical glass fiber with an ultraviolet-curable protective coating having a low modulus and which retains a low modulus at −60° C. comprising, applying to a freshly drawn optical glass fiber a liquid coating composition as recited in claim 1 and then curing the wet coated glass fiber by exposure to ultraviolet light.

* * * * *